United States Patent
Steinbart et al.

(10) Patent No.: US 6,333,580 B1
(45) Date of Patent: Dec. 25, 2001

(54) COMMUTATOR MOTOR WITH A RETENTION DEVICE FOR RETAINING A BRUSH DURING ASSEMBLY

(75) Inventors: Dagmar Steinbart, Veitshoechheim; Werner Seuffert, Bergrheinfeld, both of (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/709,561

(22) Filed: Nov. 13, 2000

Related U.S. Application Data

(63) Continuation of application No. PCT/DE99/01296, filed on May 3, 1999.

(30) Foreign Application Priority Data

May 11, 1998 (DE) ................................. 198 21 053

(51) Int. Cl.[7] .................................................. H02K 13/00
(52) U.S. Cl. ............................................ 310/239; 310/242
(58) Field of Search .................................... 310/239, 242, 310/248, 88, 89, 42, 40 MM

(56) References Cited

U.S. PATENT DOCUMENTS

| | | | |
|---|---|---|---|
| 4,293,789 | * 10/1981 | King ................................... | 310/239 |
| 4,694,214 | * 9/1987 | Stewart, Sr. ...................... | 310/239 |
| 5,004,943 | * 4/1991 | Gagneux ............................ | 310/239 |
| 5,006,747 | * 4/1991 | Stewart, Sr. ...................... | 310/239 |
| 5,296,772 | * 3/1994 | Bradfield et al. ................. | 310/242 |
| 5,444,320 | 8/1995 | Clarke et al. ..................... | 310/239 |
| 5,747,911 | * 5/1998 | Kikly ................................. | 310/239 |

FOREIGN PATENT DOCUMENTS

| | | |
|---|---|---|
| 4 235 962 C2 | 5/1994 | (DE) . |
| 0 682 398 A1 | 11/1995 | (EP) . |
| 2 625 628 | 7/1989 | (FR) . |
| 08-186957 | 7/1996 | (JP) . |

* cited by examiner

Primary Examiner—Joseph Waks
(74) Attorney, Agent, or Firm—Sughrue Mion, PLLC

(57) ABSTRACT

An axially movable protective sleeve is provided for the axial assembly of a rotor-side commutator onto a stator-side brush holder. The protective sleeve both protects against moisture and provides an axial assembly that is simple in production. The axially movable protective sleeve encircles a commutator, and initially secures brushes in a retention position for assembly and then releases the brushes to rest on a brush contact surface of the commutator, when the commutator is in its operational end position.

22 Claims, 4 Drawing Sheets

COMMUTATOR MOTOR WITH A RETENTION DEVICE FOR RETAINING A BRUSH DURING ASSEMBLY

This is a Continuation of International Application PCT/DE99/01296, with an international filing date of May 3, 1999, the disclosure of which is incorporated into this application by reference.

FIELD OF AND BACKGROUND OF THE INVENTION

The invention relates to a commutator motor with a retention device that retains a brush during assembly. Commutator motors of this type are provided, in particular, as drive motors for motor-driven pump units in automatic brake systems (ABS) in motor vehicles and must be protected from moisture.

In a motor-driven pump unit, especially for an ABS drive such as is known through EP 0 682 398 B1, for example, a vat-like motor housing is provided to seal the motor. The motor housing has an open side with an edge that rests axially against the pump housing. The vat-like motor housing is sealed on the apical side through a brush carrier plate in such a manner that the brushes, positioned on the brush carrier plate on the inner side of the motor, are not accessible upon assembly in the motor housing. During the assembly, the rotor and the commutator are mounted in the motor housing before the brush carrier plate is sealingly mounted.

A commutator motor with an axially flanged drive housing that is sealed against moisture is known from Laid Open German Application DE 42 35 962 C2. In this reference, a brush carrier plate with brushes that are displaceable against a commutator is disposed between the apical faces of a motor housing and a drive housing. The brush carrier plate simultaneously serves as a flat sealing element sealing against moisture between the apical faces of the motor housing and the drive housing.

Finally, U.S. Pat. No. 5, 444, 320 teaches an assembly procedure for a commutator motor in which brushes are initially held fixed in a retention position for the assembly by a sleeve encircling the commutator. Following assembly of the rotor, the brushes are released into their operational end position by axial displacing the sleeve.

OBJECTS OF THE INVENTION

According to one objective of the present invention, it is sought to provide a simple assembly both of a rotor-side commutator suitable for mass production, and of a stator-side brush carrier plate that is already assembled with brushes on its inaccessible, inner side facing the commutator. In addition, the assembly should ensure a moisture-proof seal that is, in particular, sufficient for protecting a commutator against the penetration of leaking fluids.

SUMMARY OF THE INVENTION

These and other objectives are achieved by the present invention by providing a commutator motor according to the invention, which not only provides moisture protection, but also includes a retention mechanism that retains the brushes facing the commutator during assembly.

According to one formulation, the invention provides a commutator motor including a brush holder, and a commutator having a brush contact surface, where the commutator and the brush holder have a mutual end position. The commutator motor also includes a plurality of brushes positioned in the brush holder, and a protective sleeve encircling the brush contact surface at a first radial distance. The protective sleeve includes a cover area having a plurality of plug-through openings for the plurality of brushes. The protective sleeve is axially movable from a retention position for assembly and an operational final position and secures the plurality of brushes in the retention position at a second radial distance from the brush contact surface during mutual axial assembly of the commutator and the brush holder. Upon the commutator reaching the mutual end position, the protective sleeve is axially moved to the operational final position and releases the plurality of brushes to extend through the plurality of plug-through openings to contact the brush contact surface.

Preferably, the present invention provides a protective sleeve encircling a brush contact surface of a commutator at a small radial distance. The protective sleeve protects the brush contact surface from moisture and leaking fluids that could otherwise encroach, even after the brush holder is closed. Due to the axial displaceability of the protective sleeve, the protective sleeve can be used to first secure the brushes in a non-obstructing retention position for assembly, thereby permitting the axial assembly of the rotor-side commutator and the brush holder onto one another. The protective sleeve can then be used to automatically release the brushes into their operational position to rest on the brush contact surface only once the components, namely the commutator with rotor, on the one hand, and the brush carrier plate with premounted brushes, on the other hand, are assembled together.

The present invention further achieves independent axial displacement of the protective sleeve from its retention position into its operational final position, while still allowing sizing to be compact. The invention further ensures operation free of grinding between the rotating commutator and the stationary encircling protective sleeve, despite the rotational tolerance inherent in mass production. These additional advantages are achieved by a second aspect of the present invention that provides a protective sleeve having a smaller radial distance from the brush contact surface of the commutator to the area retaining the brushes than to the area of the actual protective cover. Expediently, the protective sleeve is secured preferably, by means of scraping ribs, to be axially displaceable in the brush retention portion in a sliding press-fit connection. This permits easy axial displacement of the protective sleeve during assembly of the commutator to the brush holder and also ensures that the protective housing will be fixed in an operational end position that is secure against the vibrations associated with operation.

The axial displacement of the protective sleeve from its brush retaining position, wherein the brushes arc held in a retracted portion, into its operational end position, wherein the brushes are released, is performed in a particularly simple manner. Namely, the commutator axially displaces the protective sleeve by striking the free apical side of the protective sleeve, thereby causing axial entrainment of the protective sleeve as the result of the relative movement between the commutator and the brush holder during the assembly operation.

BRIEF DESCRIPTION OF THE DRAWINGS

The invention and advantageous refinements thereof are explained in more detail below with the aid of diagrammatic, exemplary embodiments in the drawing, in which.

DETAILED DESCRIPTION OF THE PREFERRED EMBODIMENTS

Figure 2:
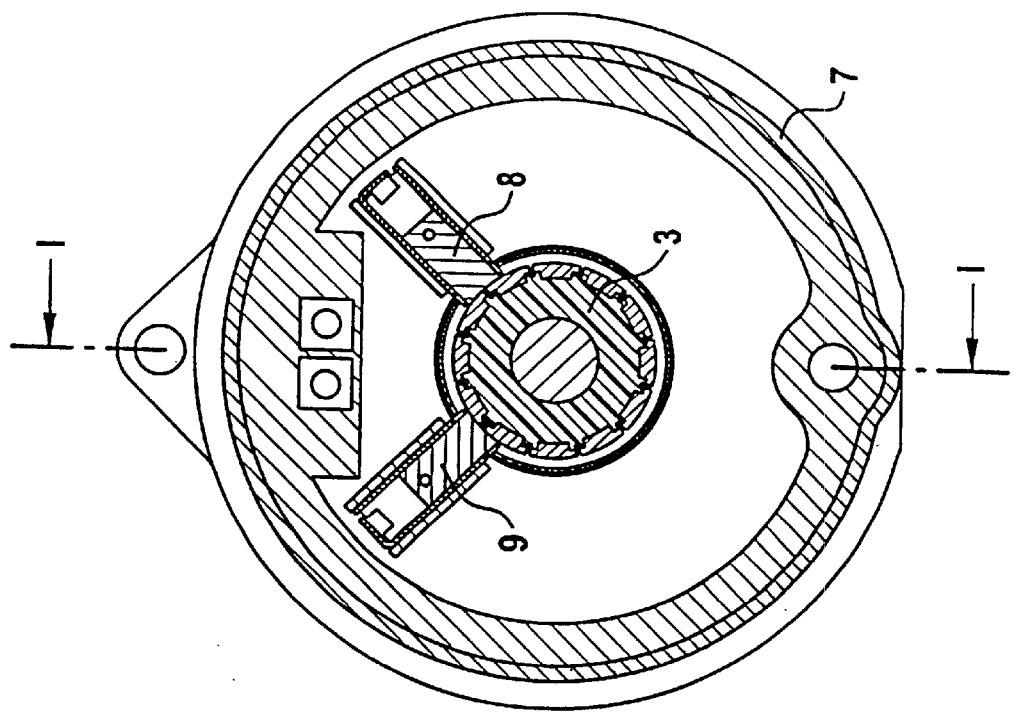
FIG. 2 shows a section through the electric motor of FIG. 1 along the line II—II.
Figure 1:
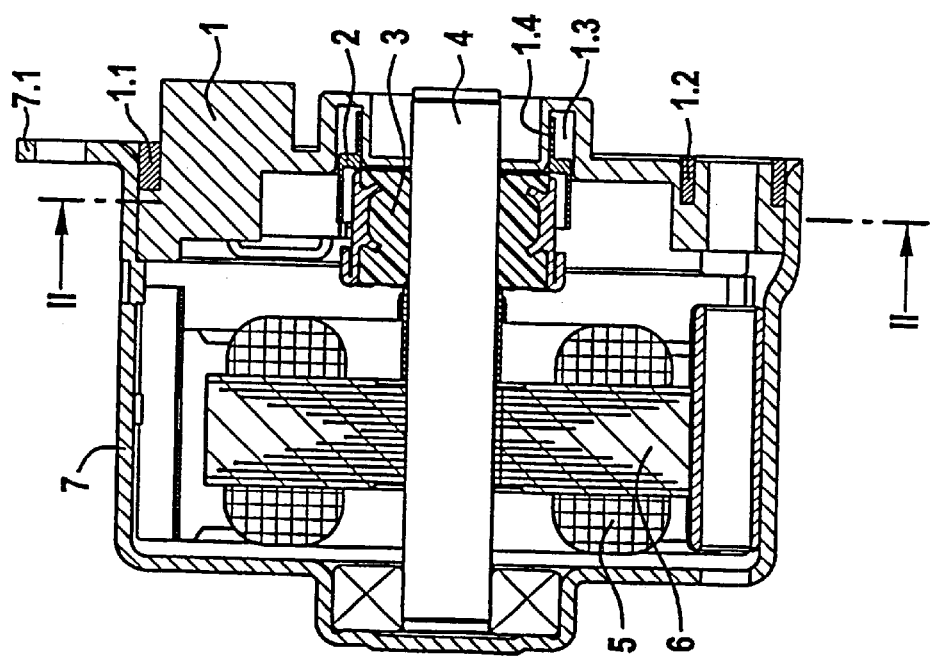
FIG. 1 shows an axial section through a motor used for driving a motor-driven pump unit for an ABS drive, to illustrate a preferred embodiment of the invention.

FIGS. 1 and 2 show a commutator motor with a vat-shaped motor housing 7. The motor housing 7 has an open side preferably having an outer edge 7.1. The outer edge 7.1 is positioned so as to abut a pump housing, not represented here. The outer edge of 7.1 is closed off by an apically closed brush holder 1 that is sealed against the motor housing 7 by seals 1.1 and 1.2.

In the brush holder 1, brushes 8 and 9 are held in a guidable fashion. In their operational position, as shown in FIG. 2, the brushes 8 and 9 lie on the brush contact surface of the commutator 3, which surface is formed by lamellas.

The commutator 3 is received by a rotor shaft 4 which is mounted rotatably with its left end in the motor housing 7. The rotor shaft 4 also carries a rotor plate body 6 provided with coil windings 5. The right end of the rotor shaft 4 projects into an axially adjacent pump housing in a manner not shown here in detail. The right end of the rotor shaft 4 is mounted rotatably in the pump housing so that it drives pump tappets of a hydraulic pump.

Figure 7:
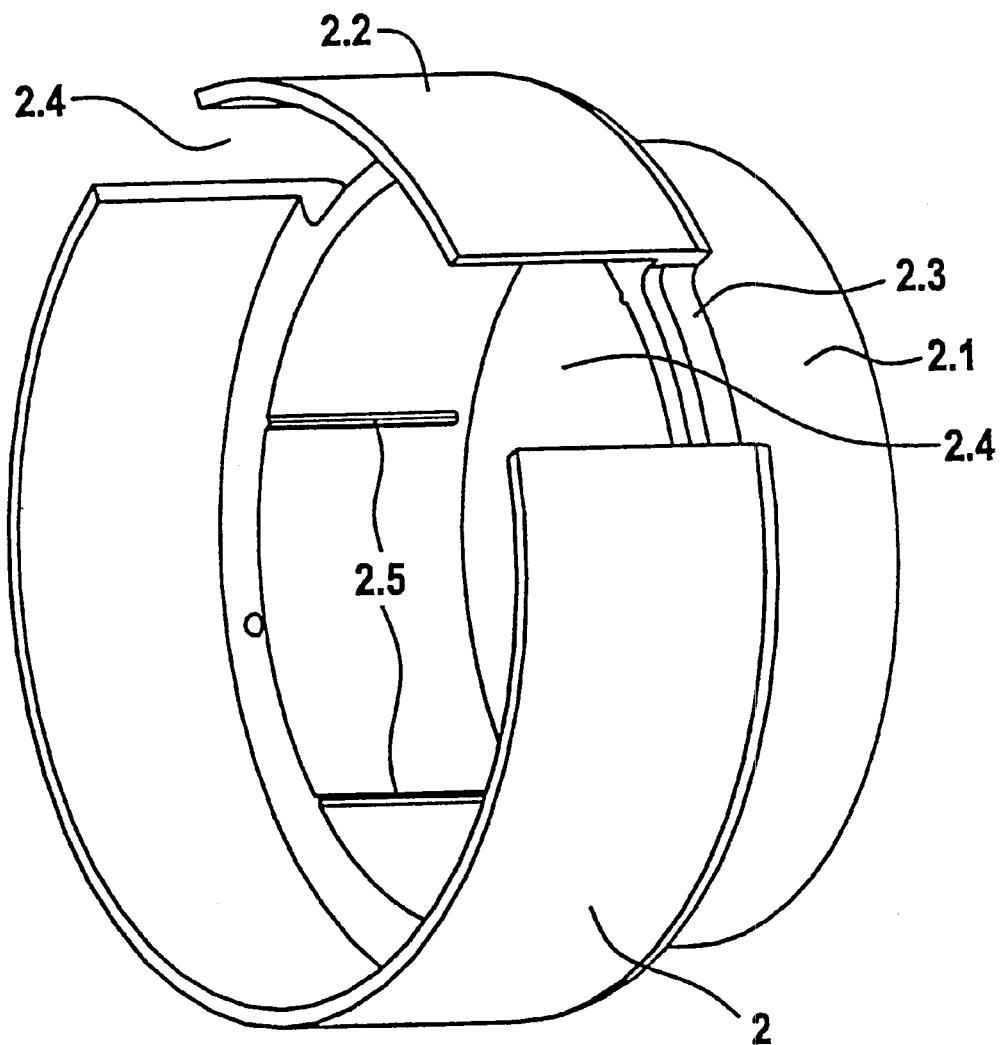
FIG. 7 shows a protective sleeve in enlarged perspective representation.

The protective sleeve 2 is depicted enlarged in FIG. 7. The protective sleeve 2 engages with the brush holder 1, via a guidance-fixation area 2.1 located on the right apical side of the protective sleeve 2. The guidance-fixation area 2.1 is offset radially inwards, as shown in FIG. 7, and plugs axially into an annular groove-like accommodation space 1.3 of the brush holder 1, as shown in FIG. 1. The protective sleeve 2 is held in an axially guidable fashion on a corresponding ledge 1.4 of the brush holder 1, in a sliding press-fit connection. The annular groove-like accommodation space 1.3 works together with the axially plugged-in guidance-fixation area 2.1 of the protective sleeve 2 to form a barrier that prevents the unwanted penetration of leaking fluids. Preferably, the protective sleeve 2 is provided with scraping ribs 2.5, on an inner wall of the guidance or fixation area 2.1, that enhance the sliding-clamping connection.

Figure 4:
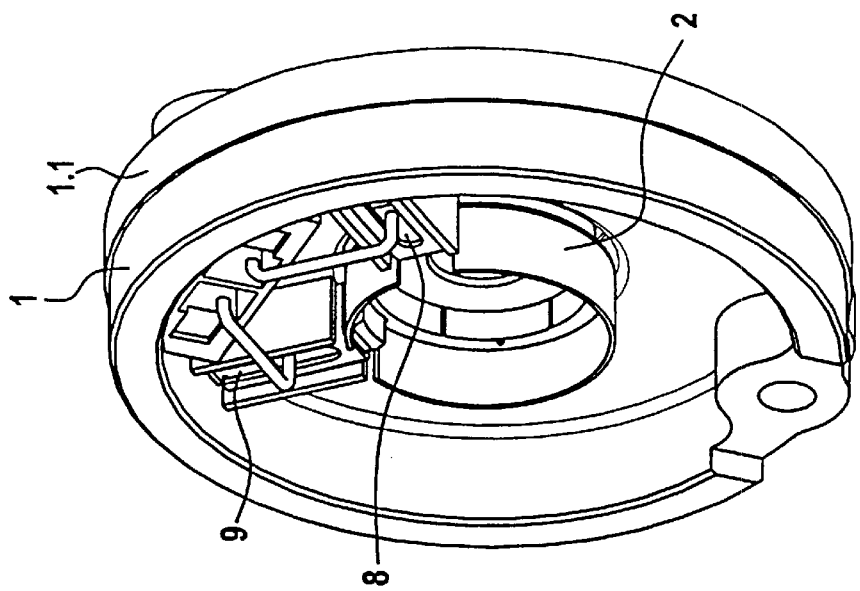
FIG. 4 shows a perspective representation of the brush holder of FIG. 3.
Figure 3:
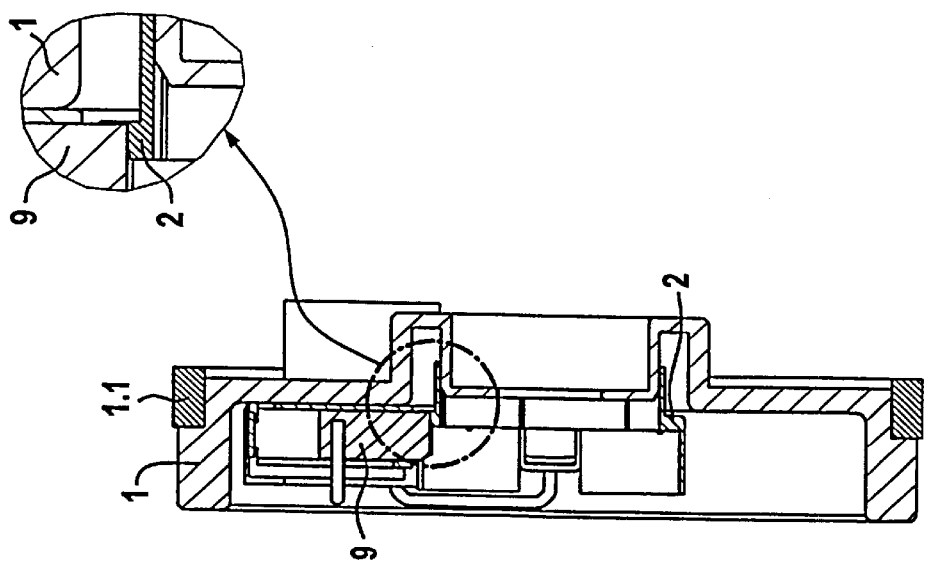
FIG. 3 shows, in axial section, a brush holder with a protective sleeve in its retention position for holding the brushes retracted during assembly.
Figure 6:
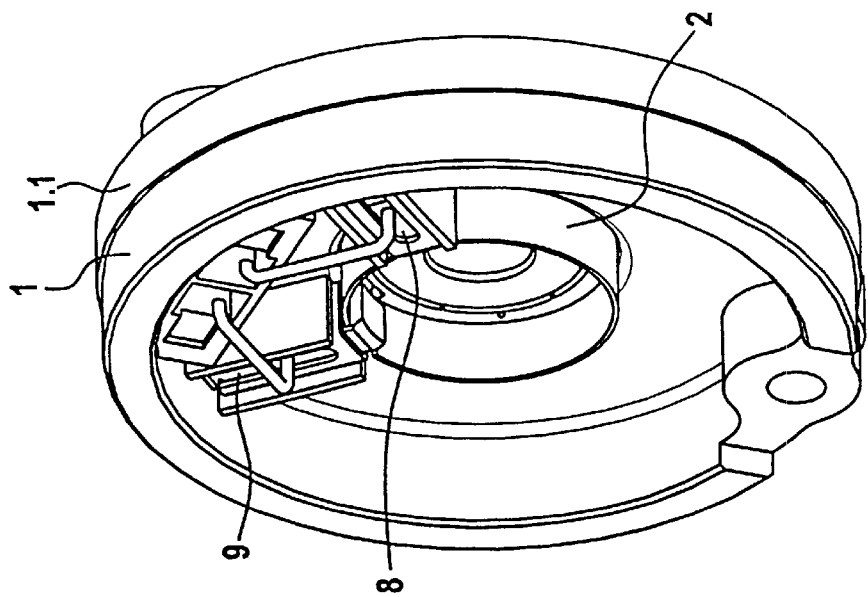
FIG. 6 shows a perspective representation of the brush holder of FIG. 5.
Figure 5:
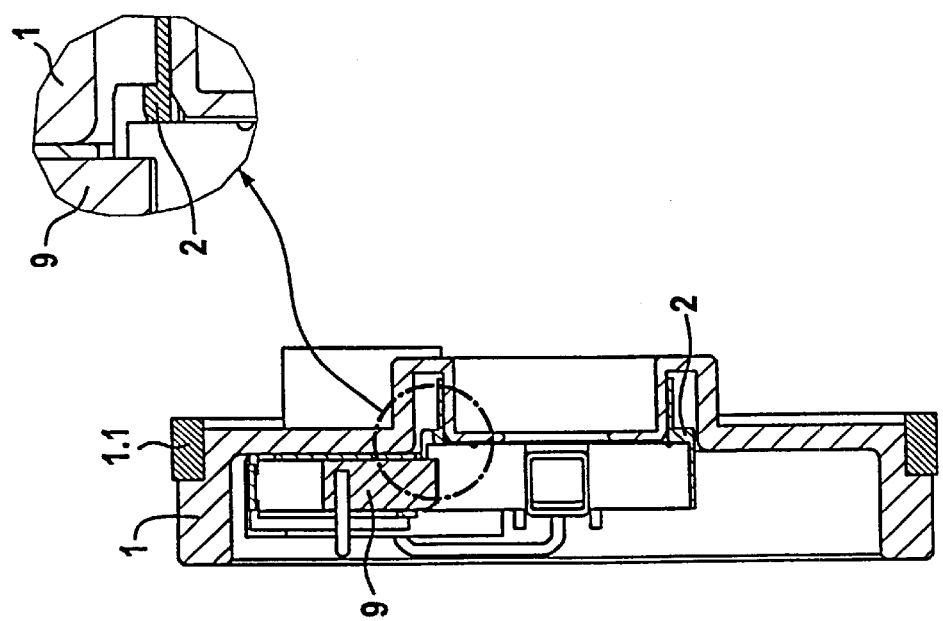
FIG. 5 shows, in axial section, a brush holder with a protective sleeve in its operational position wherein the brushes are released.

A retention area 2.3 extends outward radially from the guidance-fixation area 2.1. The guidance-fixation area 2.1 is stepped radially inward, such that the retention area 2.3 reaches radially outward further than the area 2.1. In their assembly retention position, the brushes 8 and 9 lie on the retention area 2.3, as shown in FIGS. 3 and 4. The actual cover area 2.2 of the protective sleeve 2 lies adjacent, radially flush, to this retention area 2.3.

During the assembly process, the brush holder 1, together with the protective sleeve that is mounted thereto by means of the above-described press-clamp-fit connection, is axially mounted to the rotor-side commutator. Preferably, the commutator 3 at this stage has already been equipped with a rotor shaft 4 that receives the commutator 3 and a rotor plate body 6 having a coil winding 5 and has been positioned in the motor housing 7. Thereafter, the right apical side of the commutator 3 strikes the radially stepped retention area 2.3 of the protective sleeve 2 and shifts it to the right. The protective sleeve 2 is shifted in such a manner that, in the mutual operational end position of the commutator 3 and the brush holder 1, the brushes 8 and 9 are released by the retention area 2.3 from their assembly retention position. After being released, the brushes 8 and 9 rest on the brush contact surface of the commutator 3. Furthermore, upon being released, the brushes 8 and 9 extend through brush slots 2.4 of the actual cover area 2.2 of the protective sleeve 2, which area protects the brush contact surface from fluid.

The above description of the preferred embodiment has been given by way of example. From the disclosure given those skilled in the art will not only understand the present invention and its attendant advantages, but will also find apparent various changes and modifications to the structures disclosed. It is sought, therefore, to cover all such changes and modifications as fall within the spirit and scope of the invention, as defined by the appended claims, and equivalent thereof.

What is claimed is:

1. A commutator motor comprising:

a brush holder having a brush carrier plate;

a commutator having a brush contact surface, said commutator and said brush holder having a mutual end position;

a plurality of brushes positioned in said brush holder; and a protective sleeve that is guidably held on an apical face of said brush carrier plate, said protective sleeve encircling said brush contact surface at a first radial distance and comprising a cover area having a plurality of plug-through openings for said plurality of brushes;

wherein said protective sleeve is axially movable from a retention position for assembly and an operational final position, wherein said protective sleeve secures said plurality of brushes in the retention position at a second radial distance from said brush contact surface during mutual axial assembly of said commutator and said brush holder, and upon said commutator reaching the mutual end position, said protective sleeve is axially moved to the operational final position and releases said plurality of brushes to extend through said plurality of plug-through openings to contact said brush contact surface.

2. The commutator motor according to claim 1, wherein said plurality of brushes are positioned in said brush holder at a location that is not accessible from outside the commutator motor.

3. The commutator motor according to claim 1, wherein said plurality of plug-through openings comprise a plurality of axially open brush slots.

4. The commutator motor according to claim 1, further comprising a motor housing that houses said commutator motor;

wherein said brush holder comprises a brush carrier plate that axially closes off said motor housing, and said brushes are guidably held on an apical face of said brush carrier plate facing said motor housing.

5. The commutator motor according to claim 4, wherein the motor housing is vat-shaped.

6. The commutator motor according to claim 1, further comprising a motor housing that houses said commutator motor;

wherein said brush carrier plate axially closes off said motor housing, and said apical face of said brush carrier plate faces said motor housing.

7. The commutator motor according to claim 1, wherein said brush holder has an accommodation space that is open on a side facing said commutator, and said protective sleeve is axially guided and fixed in said accommodation space.

8. The commutator motor according to claim 7, wherein said accommodation space is an annular accommodation space.

9. The commutator motor according to claim 7, wherein said protective sleeve is held relative to said brush holder in a press-fit connection.

10. The commutator motor according to claim 7, wherein said protective sleeve further comprises scraping ribs that hold said protective sleeve axially on said brush holder.

11. The commutator motor according to claim 10, wherein said scraping ribs are molded in an inner wall of said protective sleeve.

12. The commutator motor according to claim 1, wherein said protective sleeve further comprises a guidance-fixation area for guiding and fixing said protective sleeve on said brush holder, wherein said cover area protectively covers said commutator, and wherein said protective sleeve is positioned at a smaller radial inner distance from said brush contact surface in said guidance-fixation area than in said cover area.

13. The commutator motor according to claim 1, wherein said protective sleeve further comprises a retention area retracting said plurality of brushes during assembly, wherein said cover area protectively covers said commutator, and wherein said protective sleeve is positioned at a smaller radial inner distance from said brush contact surface in said retention area than in said cover area.

14. The commutator motor according to claim 1, wherein said protective sleeve is formed of molded plastic.

15. The commutator motor according to claim 1, wherein said brush holder is formed of molded plastic.

16. The commutator motor according to claim 1, wherein said commutator axially moves said protective sleeve from the retention position to the operational final position by striking said protective sleeve and reaching the mutual end position during the mutual axial assembly of said commutator and said brush holder.

17. A protective sleeve comprising:
a guidance-fixation area for guiding and fixing said protective sleeve on a brush holder, said guidance-fixation area having a first radius;
a retention area for retaining brushes during assembly of a commutator to a brush holder, said retention area having a second radius, and said retention area being adjacent to said guidance-fixation area and stepped radially outward relative to said guidance-fixation area; and
a cover area having a plurality of plug-through openings and being adjacent and radially flush to said retention area, said cover area having a third radius that is larger than said first radius and said second radius.

18. The protective sleeve according to claim 17, wherein said protective sleeve further comprises scraping ribs for axially guiding and fixing said protective sleeve axially on the brush holder.

19. The protective sleeve according to claim 17, wherein said plurality of plug-through openings comprise a plurality of axially open brush slots.

20. The protective sleeve according to claim 17, wherein said protective sleeve is formed of molded plastic.

21. A brush holder arrangement comprising:
a brush carrier plate;
a plurality of brushes that are held on a face of said brush carrier plate movably between an assembly position and an operational position; and
a protective sleeve comprising:
a first area that secures said protective sleeve to said brush carrier plate, said first area having a first radius;
a second area that holds said plurality of brushes in the assembly position, said second area having a second radius; and
a third area having a plurality of openings for said plurality of brushes in the operational position, said third area having a third radius that is larger than the first radius and the second radius.

22. The brush holder arrangement according to claim 21, wherein an axial relative movement between said plurality of brushes and said protective sleeve moves said plurality of brushes between the assembly position and the operational position.

* * * * *